(12) United States Patent
Leteinturier et al.

(10) Patent No.: US 9,404,434 B2
(45) Date of Patent: Aug. 2, 2016

(54) UNIVERSAL SOLENOID DRIVER

(71) Applicant: Infineon Technologies AG, Neubiberg (DE)

(72) Inventors: Patrick Leteinturier, München (DE); Joseph Funyak, Rochester Hills, MI (US); Kyle Williams, Howell, MI (US); Christian Schweikert, München (DE)

(73) Assignee: Infineon Technologies AG, Neubiberg (DE)

( * ) Notice: Subject to any disclaimer, the term of this patent is extended or adjusted under 35 U.S.C. 154(b) by 198 days.

(21) Appl. No.: 14/151,484

(22) Filed: Jan. 9, 2014

(65) Prior Publication Data

US 2015/0192178 A1    Jul. 9, 2015

(51) Int. Cl.

| G06F 19/00 | (2011.01) |
|---|---|
| F02D 41/30 | (2006.01) |
| F02D 41/14 | (2006.01) |
| F16D 48/06 | (2006.01) |
| F16D 27/00 | (2006.01) |
| F02D 41/20 | (2006.01) |
| F02D 41/26 | (2006.01) |
| F02D 41/28 | (2006.01) |
| F16D 48/02 | (2006.01) |

(52) U.S. Cl.
CPC ............ *F02D 41/30* (2013.01); *F02D 41/1401* (2013.01); *F16D 48/062* (2013.01); *F02D 41/20* (2013.01); *F02D 41/26* (2013.01); *F02D 2041/1418* (2013.01); *F02D 2041/1419* (2013.01); *F02D 2041/2048* (2013.01); *F02D 2041/2062* (2013.01); *F02D 2041/281* (2013.01); *F02D 2041/286* (2013.01); *F02D 2250/12* (2013.01); *F16D 2027/002* (2013.01); *F16D 2048/0221* (2013.01); *F16D 2500/3022* (2013.01); *F16D 2500/3024* (2013.01); *F16D 2500/3026* (2013.01); *F16D 2500/3028* (2013.01); *F16D 2500/3063* (2013.01); *F16D 2500/7061* (2013.01); *F16D 2500/70426* (2013.01)

(58) Field of Classification Search
CPC .............. F16D 27/14; F16D 2027/002; F02D 41/1401; F02D 41/30; F02D 41/20; F02D 2041/2062; F02D 2250/12; F02D 2041/281; F02D 2041/1418; F02D 2041/286; F02D 41/26; F02D 2041/1419
See application file for complete search history.

(56) References Cited

U.S. PATENT DOCUMENTS

| 4,279,230 | A | * | 7/1981 | Bauer | ................. F02D 35/0053 123/680 |
|---|---|---|---|---|---|
| 5,056,026 | A | * | 10/1991 | Mitchell | ............. F02D 41/2425 701/101 |
| 7,059,304 | B2 | | 6/2006 | Manzone et al. | |

(Continued)

*Primary Examiner* — David J Hlavka
(74) *Attorney, Agent, or Firm* — Shumaker & Seiffert, P.A.

(57) ABSTRACT

A device may include a driver integrated circuit (IC) comprising a first control unit and a second control unit, a first solenoid that is electrically coupled to the first control unit, a second solenoid that is electrically coupled to the second control unit; at least one sensor, a clock that synchronizes a microcontroller and the driver IC, and a peripheral bus that communicatively couples the first control unit, the second control unit. The microcontroller and the driver IC form an outer control loop that actuates the first solenoid and the second solenoid, and the first control unit, the second control unit, and the at least one sensor form an inner control loop that controls the first solenoid and the second solenoid.

20 Claims, 9 Drawing Sheets

(56) References Cited

U.S. PATENT DOCUMENTS

| | | | | |
|---|---|---|---|---|
| 7,280,339 | B2 * | 10/2007 | Manzone | F02D 41/266 123/490 |
| 9,097,345 | B2 * | 8/2015 | Funyak | B60W 50/0205 |
| 2003/0195692 | A1 * | 10/2003 | Stevens | F02D 41/20 701/104 |
| 2013/0088264 | A1 | 4/2013 | Barrenscheen et al. | |
| 2015/0057806 | A1 * | 2/2015 | Schweikert | F02D 41/20 700/275 |

* cited by examiner

UNIVERSAL SOLENOID DRIVER

TECHNICAL FIELD

The invention relates to solenoids, and more particularly, but without limitation to solenoids used in automotive engine systems.

BACKGROUND

Automatic systems, such as vehicle transmissions, and fuel injection systems generally include a number of solenoids that are actuated to control those systems. In the case of a vehicle transmission, a driver circuit actuates solenoids to engage and disengage hydraulically controlled clutches. By selectively engaging different clutches or combinations of clutches within the automotive transmission, a transmission control system may select a gear ratio for the transmission. In the case of a fuel injection system, a driver circuit may actuate solenoids that control fuel injectors. The fuel injectors release fuel into the cylinders of the engine.

SUMMARY

In general, this disclosure is directed toward a driver integrated circuit (IC) that is used for automotive systems or other vehicle systems, although the driver IC may also be used in other types of systems. The driver IC includes first and second control units that each drive a solenoid that is coupled the first or second control unit. The first and second control units are communicatively coupled with at least one sensor of the automotive system, and to each other via a peripheral bus. The first and second control units, the solenoids, and the at least one sensor form a first, inner control loop. The first and second control units of the driver IC are also communicatively coupled with a microcontroller. The first and second control units and the microcontroller form a second, outer control loop. Based on sensor data, messages received from the first and second control units, the microcontroller, and electrical parameters of the solenoids, the first and second control units may actuate the first and second solenoids.

The control units generate and receive control signals based on received signals, sensor data, and electrical parameters of the solenoids. The first and second control units may send messages to each other via a peripheral bus that communicatively couples the first and second control units.

In one example, this disclosure is directed to a device comprising a driver IC comprising a first control unit and a second control unit. The device further includes a first solenoid that is electrically coupled to the first control unit, a second solenoid that is electrically coupled to the second control unit, at least one sensor, a clock that synchronizes a microcontroller and the driver IC, and a peripheral bus that communicatively couples the first control unit, the second control unit. The microcontroller and the driver IC form an outer control loop that actuates the first solenoid and the second solenoid, and the first control unit, the second control unit, and the at least one sensor form an inner control loop that controls the first solenoid and the second solenoid.

In another example, this disclosure is directed to a method comprising receiving, from a microcontroller by a driver IC that includes a first control unit configured to control a first solenoid and a second control unit configured to control a second solenoid driver, a first feedback signal generated via a first control loop that comprises the microcontroller, the first control unit, and the second control unit. The method further includes receiving, by at least one of the first control unit and the second control unit, a second feedback signal generated via a second control loop that comprises the first control unit, the second control unit, and at least one sensor, and generating, by at least one of the microcontroller, the first control unit, and the second control unit based on at least one of the first feedback signal and the second feedback signal, a signal that causes one of the first control unit and the second control unit to actuate one of the first solenoid and the second solenoid.

The details of one or more examples are set forth in the accompanying drawings and the description below. Other features, objects, and advantages of this disclosure will be apparent from the description and the figures, and from the claims.

DETAILED DESCRIPTION

In general, this disclosure is directed toward an integrated circuit (IC) configured to actuate one or more solenoids in an automotive system, such as an automotive transmission, an automotive direct injection system, or other automotive system. The IC comprises first and second control units, which are each communicatively coupled with a solenoid. A control unit may drive a solenoid in order to control part of an automotive system, such as a clutch or a fuel injector. Although the description below focuses on an automotive example, the drive IC may also be used with other types of vehicles as well as other non-vehicular systems.

The first and second control units are coupled with sensors of the automotive system, as well as with each other. The first and second control units, the solenoids and the sensors form a first, inner control loop. The first and second control units are also communicatively coupled with a microcontroller. The first and second control units, and the microcontroller form an outer control loop. The inner and outer control loops send message and control signals, which may control the actuation of the solenoids by the first and second control units.

Figure 1:
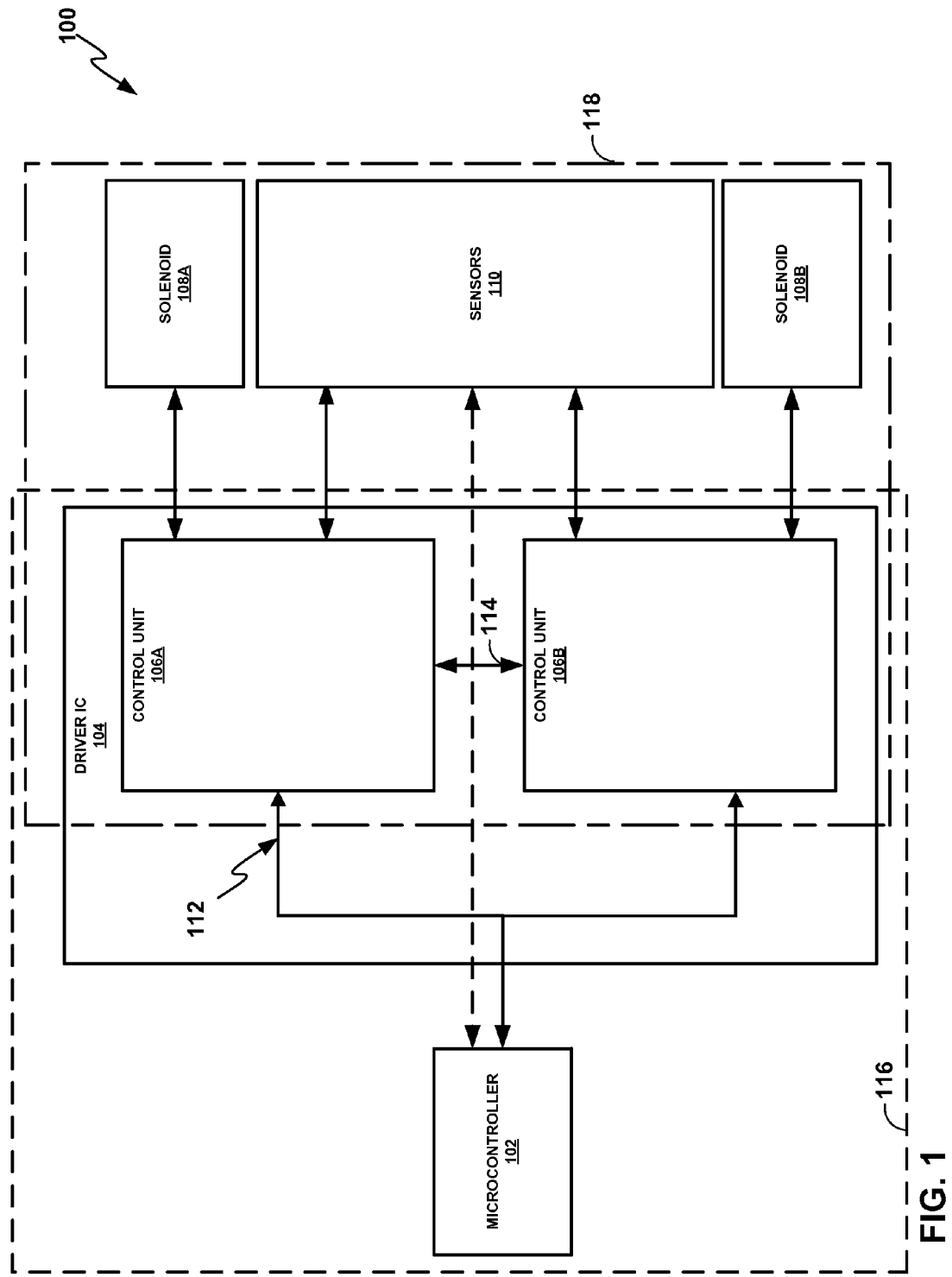
FIG. 1 is a block diagram illustrating a driver integrated circuit (IC) in an automotive system in accordance with one or more examples of this disclosure.

FIG. 1 is a block diagram illustrating a driver integrated circuit (IC) in an automotive system in accordance with one or more examples of this disclosure. FIG. 1 illustrates an automotive control system 100 that includes driver integrated circuit (IC) 104, microcontroller 102, solenoids 108A-108B ("solenoids 108"), and sensors 110. Automotive control system 100 and driver IC 104 may be configured to actuate solenoids 108 based on one or more control signals in accordance with the techniques of this disclosure.

Driver IC 104 further comprises a first control unit 106A and a second control unit 106B (collectively, "control unit 106"). Control units 106 are communicatively coupled with microcontroller 102 via a communication bus 112. Communication bus 112 may comprise one or more asynchronous or synchronous busses, such as one or more asynchronous trigger buses. Control units 106 and control units 106 may comprise an outer control loop 116.

Control unit 106A is also coupled with a first solenoid 108A, and sensors 110. Control unit 106B is similarly coupled with a second solenoid 108B and sensors 110. Control unit 106A and control unit 106B are communicatively coupled with a peripheral bus 114. Peripheral bus 114 may allow to transmission of data and messages, such as control signals, between control units 106. Control units 106, solenoids 108, and sensors 110 comprise a second, inner control loop 118.

Automotive control system 100 may be configured to control a variety of different automotive systems. In various examples, automotive control system 100 may control the actuation of solenoids 108, which control the fuel injectors of an automotive direct injection system. Solenoids 108 may be driven by drivers in a high side and/or low-side driver configuration in some examples.

Control units 106 may drive solenoids 108, which may control fuel injectors of an automotive engine. In another example, control units 106 may drive solenoids 108 to control the engagement and disengagement of one or more clutches of an automotive transmission. In some examples, the drivers of solenoids 108 may be configured in a high side configuration for one of solenoids 108, and a low side configuration for another one of solenoids 108. In both the direct fuel injection case and the cases, microcontroller 102, and control units 106 may be configured to actuate solenoids 108 in accordance with a current profile.

Direct fuel injection and automotive transmission applications are just some of the applications of driver IC 104, and should be considered as non-limiting examples. Control units 106 of driver IC 104 may be configured to control other aspects of an automotive engine, as well. For example, techniques of this disclosure may also be directed to using driver IC to control an anti-lock braking solenoid, hydraulic camshaft actuation, or any other inductance-based solenoid. Using a single driver IC 104 to drive different solenoids for different applications may reduce overall system costs by simplifying system design, and may lower material costs due to the ability to produce higher volumes of a single driver IC 104 for multiple applications.

In various examples, control units 106 may actuate solenoids 108 based only on control signals and feedback signals from inner control loop 118. Within inner control loop 118, control units 106 are communicatively coupled with one or more sensors 110. Sensors 110 may comprise sensors, such as one or more voltage sensors, voltage acquisition measures, current sensors, current acquisition measures, position sensors, and/or pressure sensors, as well as sensors for detecting radio frequency (RF) coupling, and signal feedback. Control units 106 may also measure one or more electric and/or magnetic parameters of solenoids 108. As an example, control unit 106 may measure inductance, resistance, current, voltage, flux, position, and/or other electro-magnetic, and/or mechanical parameters of solenoids 108A. For the purposes of this disclosure, sensors 110 may comprise reading from one or more individual sensors, as well as the aforementioned parameters of solenoids 108. Control units 106 may actuate solenoids 108 based on sensor data 108 and/or based on parameters of solenoids 108 and/or based on a current profile. Various examples of current profiles are discussed in greater detail below with respect to FIGS. 3 and 4.

Control units 106 also may receive sensor data from sensors 110 via peripheral bus 114. Peripheral bus 114 may comprise one or more serial and/or parallel busses. Control units 106 may detect parameters of solenoids 108 via an analog interface using one or more current measurement units (illustrated below with respect to FIG. 2). Based on captured data from sensors 110 and electrical parameters of solenoids 108, which may comprise feedback and/or control signals of inner control loop 118, control units 106 may actuate one or more of solenoids 110 based on a current profile.

Figure 2:
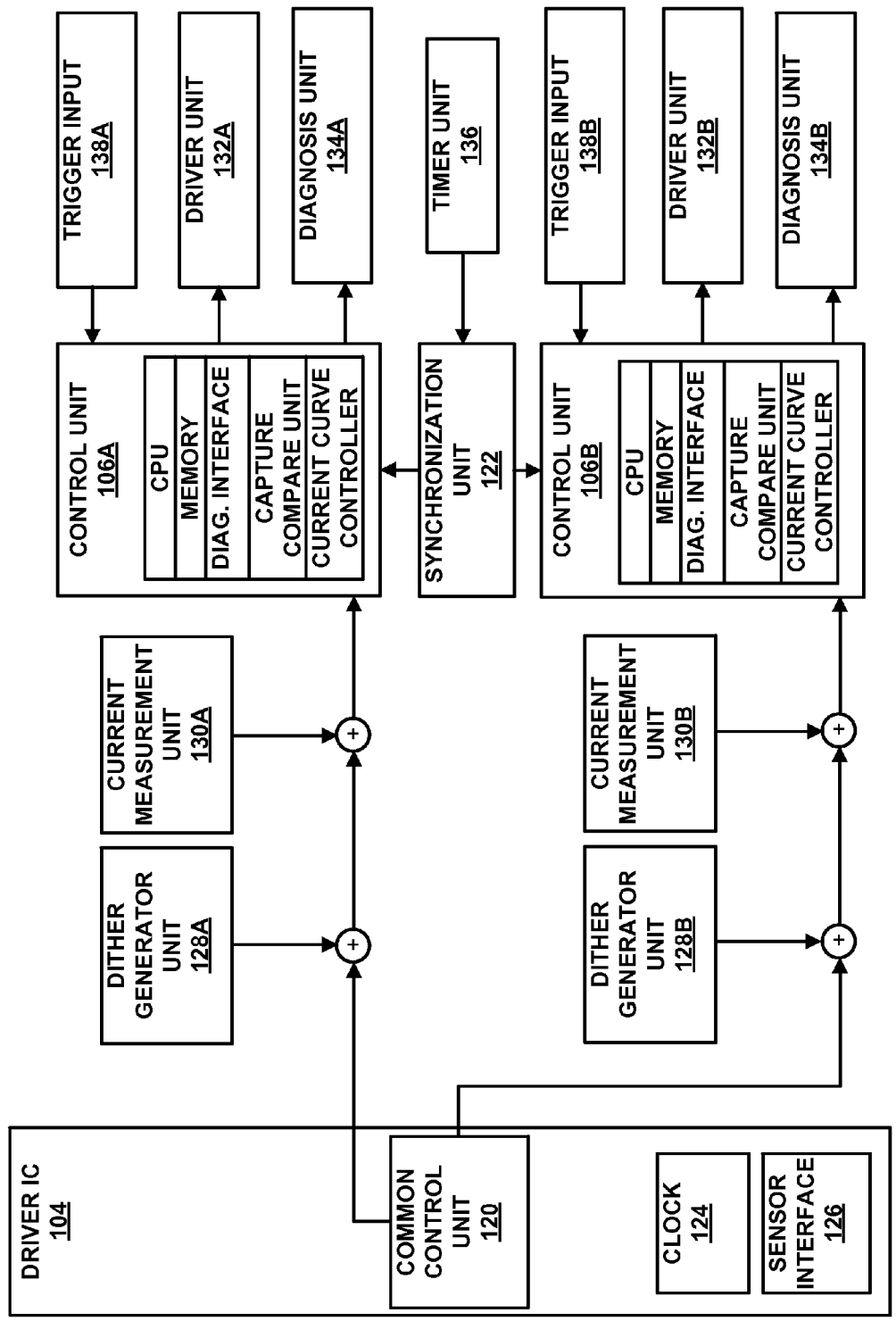
FIG. 2 is a block diagram illustrating a driver integrated circuit in accordance with the techniques of this disclosure.

Peripheral bus 114 also communicatively couples control units 106 with each other and with a synchronization unit (illustrated in greater detail in FIG. 2). Control units 106 may communicate with each other and with the synchronization unit via peripheral bus 114 by transmitting one or more messages. The one or more messages may comprise control signals of inner control loop 118, which when received by one of control units 106, may cause the one of control units 106 to actuate one of solenoids 108 based on a current profile.

Control units 106 may also actuate solenoid 108 based on one or more control signals of outer control loop 120. As stated above, outer control loop 116 includes microcontroller 102, and control units 106. Microcontroller 102 is communicatively coupled with control units 106A via a trigger bus. The trigger bus may comprise an asynchronous bus. Microcontroller 102 may transmit a trigger pulse via trigger bus 112 to one or more of control units 106. Control units 106 may receive the trigger pulse, and responsive to receiving the trigger pulse, may actuate one or more of solenoids 108. In this manner, microcontroller 106 may control the actuation of solenoids 108 using control signals transmitted in outer control loop 116.

In order to synchronize communications between microcontroller 102 and driver IC 104, driver IC and control units 106 may receive a clock signal from microcontroller 102. Driver IC 104 may function at a higher clock speed than the clock signal received from microcontroller 102. To increase the received clock signal, driver IC may utilize a phase locked loop (PLL). FIGS. 5-8 illustrate the clock signals transmitted between microcontroller 102 and control units 106, as well as synchronizing communications over peripheral bus 106 in greater detail.

Control units 106 may be configured to operate in a "coherent actuation" mode, in which microcontroller 102 transmits a trigger signal to one or more of control units 106 in some examples. The trigger pulse is used by the control units to synchronized two or more drivers without the need for additional synchronization. Additionally, control units 108 may indirectly synchronize with each other based on a programmable condition.

In some other examples, control units 106 may operate in a feedback-based mode. In the feedback-based mode, one of control units 106, e.g. control unit 106A, may receive a signal, such as a trigger signal via a trigger bus of communication bus 112 from microcontroller 102. One of control units 106, e.g. control unit 106A, may perform relative actuation of two or more actuators based on direct communications of the drivers within control unit 106A, as well as based on system feedback from sensors 110. In various examples, the system feedback from sensors 110 may include actuator position, acceleration, pressure, current, pressure, voltage, and radio frequency (RF) coupling feedback sensors.

Control units 106 may actuate solenoids 108 in response to a combination of control signals from both outer control loop 116 and inner control loop 118, referred to as a "split control loop." As one example of a split control loop, microcontroller 102 may transmit a trigger signal to one of control units 106, e.g. control unit 106A via the trigger bus of communication bus 112. Based on the trigger signal, control unit 106A may actuate solenoid 108A based on a current profile. Control unit 106B may receive a control signal from control unit 106A responsive to control unit 106A receiving the trigger signal and/or control unit 106A actuating solenoid 106A. Responsive to receiving the control signal, control unit 106B may actuate solenoid 108B based on a current profile. A signaling diagram illustrating the actuation of a first solenoid based on a CPU trigger by a first control unit, and the actuation of a second solenoid by a second control unit responsive to receiving a message from the first control unit is illustrated in greater detail below with respect to FIG. 5.

In other various examples of a split control loop, a first control, e.g. control unit 106A, may receive a trigger signal from microcontroller 102 via the peripheral bus. Responsive to receiving the trigger signal, control unit 106A may transmit a message to control unit 106B, which may cause control unit 106B to actuate solenoid 108B. Control unit 106A may later detect a condition at control unit 106B, and may perform some action responsive to detecting the condition at control unit 106B. In some examples, one of control units 106, e.g. control unit 106A may detect the change in condition at the other one of control units 106, e.g. control unit 106B by detecting a change in a value of a status register.

Thus, in accordance with the techniques of this disclosure, system 100 may comprise a driver IC 104 comprising a first control unit 106A and a second control unit 106B. System 100 further includes solenoid 108A, which includes a first solenoid coupled to first control unit 106A, and a second solenoid 108B, which is electrically coupled to second control unit 106B. System 100 includes sensors 110, which may comprise at least one sensor, a clock that synchronizes microcontroller 102 with driver IC 104, peripheral bus 114 that communicatively couples first control unit 106A and second control unit 106B. Microcontroller 102 and driver IC form 104 form outer control loop 116, which actuates the first solenoid 108A and the second solenoid 108B. The first control unit 106A, second control unit 106B, and at least one sensor of sensors 110 form an inner control loop 118 that control the first solenoid 108A and the second solenoid 108B.

FIG. 2 is a block diagram illustrating a driver integrated circuit in accordance with the techniques of this disclosure. FIG. 2 illustrates the functional units of driver IC 104. The functional units of driver IC 104 includes first control unit 106A and second control unit 106B (control units 106), common control unit 120, synchronization unit 122, a clock 124, and sensor interface 126. Driver IC 104 further may also include dither generator unit 128A, and dither generator unit 128B (dither generators 128), current measurement unit 130A, current measurement unit 130B (current measurement units 130), driver unit 132A, driver unit 132B (driver units 132), diagnosis unit 134A, diagnosis unit 134B (diagnosis units 134), and timer unit 136. Dither generators 128 may only be present for transmission control applications, in some examples.

Common control unit 120 generates common control signals to each of control unit 106A and control unit 106B. Common control signals may include common control signals for dither generator units 128. Common control unit may generate the common control signals based data received from sensor interface 126, as well as based on signals and data received from microcontroller 102 (FIG. 1). Dither generator units 128 generate dither signals, which may comprise signals having small, random fluctuations. Dither generators 128 may add the dither signal to the signals generated by common control unit 120. Dither signals may comprise signals that include random fluctuations and noise.

In some examples, dither generator units 128 may also be coupled to the output of current curve controllers of control unit 106 such that the dither signals that dither generator units 128 output is not combined or part of the signals generated by common control unit 120.

Each of current measurement units 130 may measure the current being applied to one of solenoids 108, and may add the measured current value back to the signal generated by common control unit 120 as a form of feedback. In this manner, control units 106 receive a common control unit signal, a dither signal, and a current measurement feedback signal as input, and may generate one or more output signals based on the input signals. In various examples, the modules of FIG. 2 may also include a current profile generator. The current profile generator may generate and output a current profile in accordance with the examples illustrated in FIG. 4, below. The current profile generator may generate the current profile based on a set of data points received from microcontroller 102 and/or that the current generator itself calculates.

Control units 106A and 106B correspond to those of FIG. 1. Control units 106 each may each include a central processing unit (CPU), memory, diagnostic interface, capture compare unit (CCU), and current curve controller (CCC). The CPU may comprise a reduced instruction set controller (RISC) CPU in some examples. The CPU may include one or more registers, which may include a status register. Additionally, the CPU may include a bus arbiter/direct memory access (DMA) unit, which supports reading to and writing from the memory content of instruction memory and data memory at any time. The bus arbiter/DMA unit may also synchronize control of the CCU and the CCC.

The CCCs of control unit 106 may be responsible for reading various electrical parameters, such as current, voltage, etc., from solenoids 108. The CCCs of control units 106 may also detect when an electrical parameter has reached a threshold or when another condition, based on the electrical parameters, has been met. Responsive to detecting that the threshold has been met or that the condition has occurred, the CCCs may set a flag in a status register of control unit 106 in some examples.

Figure 3:
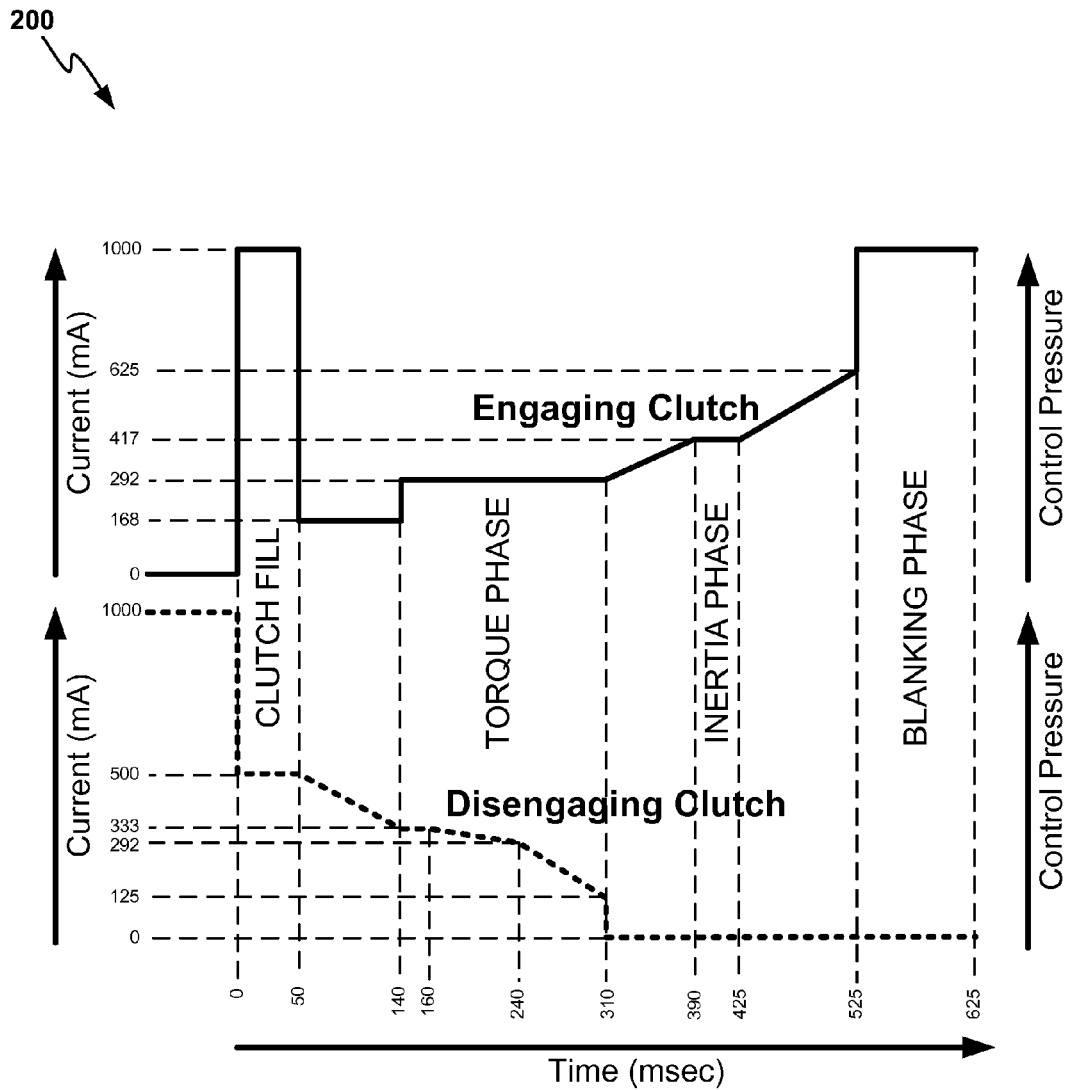
FIG. 3 is an example of a current profile in accordance with the techniques of this disclosure.
Figure 4:
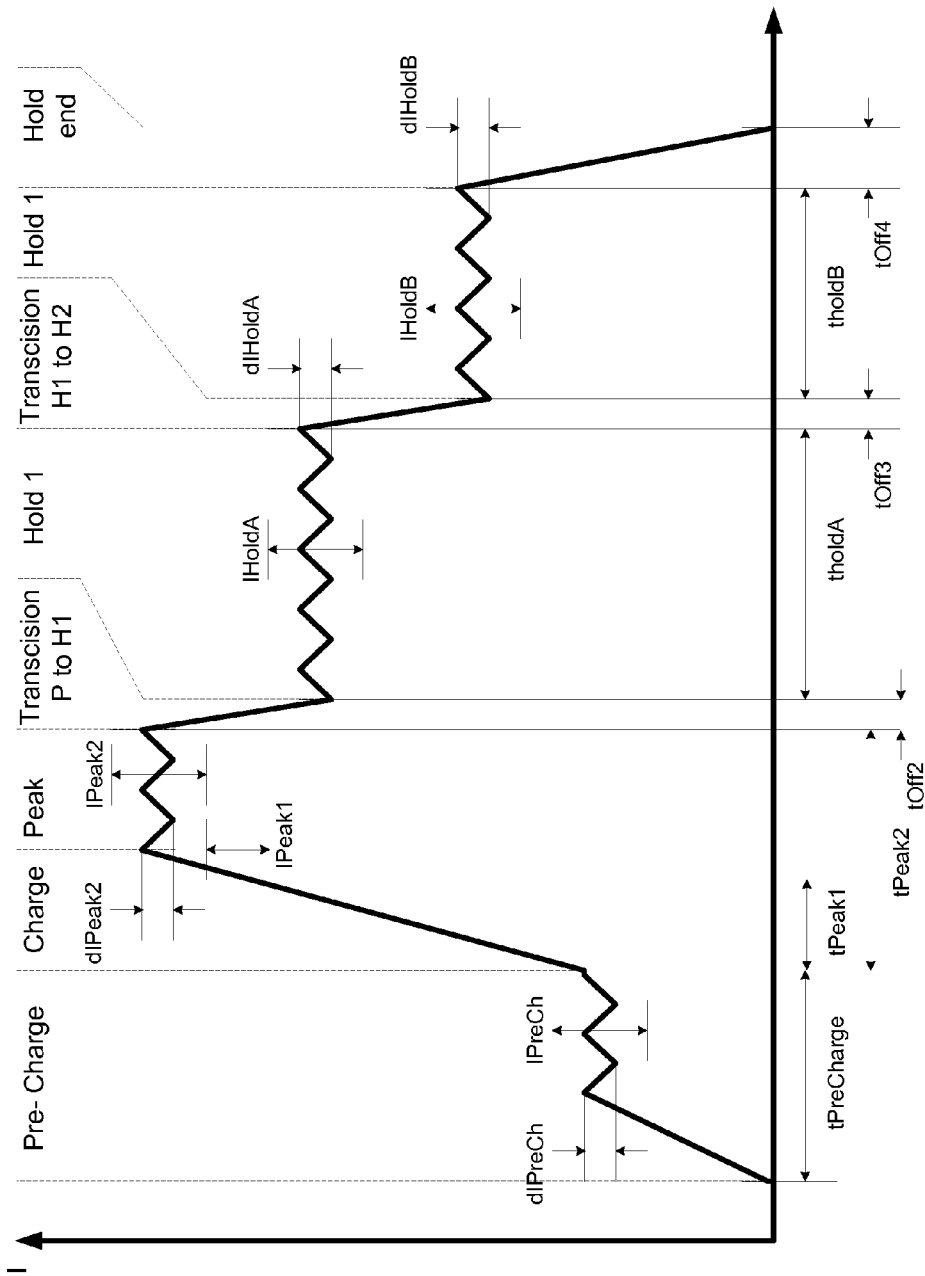
FIG. 4 is an example of a current profile in accordance with the techniques of this disclosure.

The memory of control units 106 may comprise volatile random access memory (RAM), which may contain current curve profiles, which indicate the amount of current that should be supplied to solenoids 108. Based on the current curve profiles, examples of which are illustrated in FIGS. 3 and 4, control units 108 may signal driver units 132, to actuate solenoids 108 in accordance with the programmed current profile. The memory of control units 106 may also include non-volatile SRAM, which may be used to store program code.

Control units 106 output signals that control output driver units 132, which drive solenoids 108 (FIG. 1). Control units 106 may generate the signals for driver units 132 based on signals received from common control unit 120, as well as data received from sensor interface 126. Control units 106 also output signals to diagnosis units 134.

Driver units 132 may comprise sets of high-side and low-side pre-drivers for power stages, such as external of driver IC 104 MOSFET (metal oxide semiconductor field effect transistor) or integrated power stages inside driver units 132 measurement units for system voltages and currents. Driver units 132 may also provide measurement results (e.g. current and voltage values) back to the CCC units of control units 106, as well as to diagnosis units 134.

Synchronization unit 122 may receive synchronization signals, and coordinate data handling from microcontroller 102 to control units 106. Additionally, synchronization unit 122 may send and receive signals and data to and from the two control units 106 using peripheral bus 114. Synchronization unit 122 may comprise a CPU in some examples. In some cases, synchronization unit 122 may be configured to send and receive signals to and from control units 106 via peripheral bus 114. In various examples, synchronization unit 122 may be configured to send messages to control units 106 via peripheral bus 114, and responsive to receiving the messages, and control units 106 may be configured to act responsive to receiving signals from synchronization unit 122.

In some examples, synchronization unit 122 may be configured to send control units 106 a message that causes control units 106 to actuate solenoids 108 in some examples. In other examples, synchronization unit 122 may transmit an information request message to one of control units 106. The information request may indicate that synchronization unit 122 requests a response message from the one of control units 106 when the one of control units 106 detects the occurrence of an event, e.g. that a measurement has reached a particular threshold.

Responsive to detecting that the event specified in the information request has occurred, control units 106 may send a response message to synchronization unit 122 indicating that the specified event has occurred. Driver IC 104 may also be configured to act as a responsive to receiving various signals from microcontroller 102 in some cases.

Timer unit 136 may generate time-based signals in order to synchronize control units 106, and may supply the time-based signals to synchronization unit 122 Timer unit 136 may generate the time-based synchronization signals based on clock 124. Control units 106 may supply signals that cause timer unit 136 to set or reset a timer, responsive to a condition occurring, such detecting that an electrical parameter has reached a threshold level, or that another event has occurred, such as the change in the value of a status register of a CPU of one of control units 106.

When operating in split loop mode, control unit 106A and control unit 106B may also receive asynchronous trigger signals via trigger inputs 138A and trigger input 138B, respectively. Responsive to receiving a signal from the trigger input, the one of control units 106 may generate a signal, such as a current signal for one of driver units 132, or another signal that causes the other of control units 106 to actuate one of solenoids 108.

Clock 124 may generate the clock signals for control units 106. Driver IC 104 may receive an input clock from microcontroller 102. However, the input clock from microcontroller 102 may have a lower frequency than what is required or desired to operate control units 106. Clock 124 may include and utilize a phased lock loop (PLL) to increase the clock frequency of the received clock from microcontroller 102, and may transmit the generated clock signal from the PLL to control units 106.

Diagnosis unit 134A is communicatively and/or electrically coupled to control unit 106A, and diagnosis unit 134B are communicatively and/or electrically coupled to control unit 106B. Diagnosis units 134 may capture parameters of solenoids 108, and/or data from sensors 110 to determine if the parameters are out of range, which may indicate a safety concern or hazard. More particularly, diagnosis units 134 may capture one or more of current, voltage, and temperature data from one or more of sensors 110, solenoid 108A, and solenoid 108B.

Responsive to detecting that the captured measurements are out of range and/or pose a hazard, diagnosis units 134 may perform a safety measure based on the captured data from sensors 110 and solenoids 108. To perform the safety measure, diagnosis units 134 of driver IC may be further configured to perform at least one of power-stage protection and actuator protection of at least one of the first solenoid and the second solenoid. Diagnosis units 134 may be further configured to perform a safe power stage switch-off of the automotive system that driver IC 104 and microcontroller 102 control in order to avoid at least one of system damage and harming humans using, e.g. a human driving or riding in the automobile.

FIG. 3 is an example of a current profile in accordance with the techniques of this disclosure. As described above, microcontroller 102, driver IC 104, and controller 106 may actuate solenoids 108 in accordance with a current profile. FIG. 3 illustrates a current profile for engaging two clutches, an engaging clutch, and a disengaging clutch, in an automotive transmission. One of solenoids 108, e.g. solenoid 108A, may control one clutch, and the other of solenoids 108, e.g. solenoid 108B, may control the disengaging clutch. In this example, the current used to engage each of the clutches using solenoids 108 is plotted on the y-axis. Thus, FIG. 3 illustrates an example in accordance of the techniques of this disclosure in which one or more of sensors 110 may comprise sensors of an automotive transmission. In the automotive transmission, control unit 106A may actuate, with first solenoid 108A, a first clutch of the automotive transmission, and first solenoid 108A may comprise a first clutch solenoid. Control unit 106B may further actuate, with second solenoid 108B, a second clutch of the automotive transmission, wherein second solenoid 108B comprises a second clutch solenoid.

FIG. 4 is an example of a current profile in accordance with the techniques of this disclosure. As described above, microcontroller 102, driver IC 104, and controller 106 may actuate solenoids 108 in accordance with a current profile. FIG. 4 illustrates a current profile for engaging fuel injectors, in an automotive in a Direct Injection Engine Management system. In the example of FIG. 4, solenoids 108 may comprise the fuel injectors. One of driver units 138 may control a first fuel injector, and the other one of driver units 138, may control a second fuel injector. In this example, the current used to engage each of one fuel injector using solenoids 108 is plotted on the y-axis. Thus, FIG. 4 illustrates an example in accordance of the techniques of this disclosure in which one or more of sensors 110 may comprise sensors of an automotive direct injection fuel system. In the direct injection fuel system, control unit 106A may actuate, with first solenoid 108A, a first fuel injector of the direct injection fuel system in accordance with a current profile, e.g. the current profile of FIG. 4, and first solenoid 108A may comprise a first fuel injector solenoid. Control unit 106B may further actuate, with second solenoid 108B, a second fuel injector of the direct injection fuel system, in accordance with the current profile.

Figure 5:
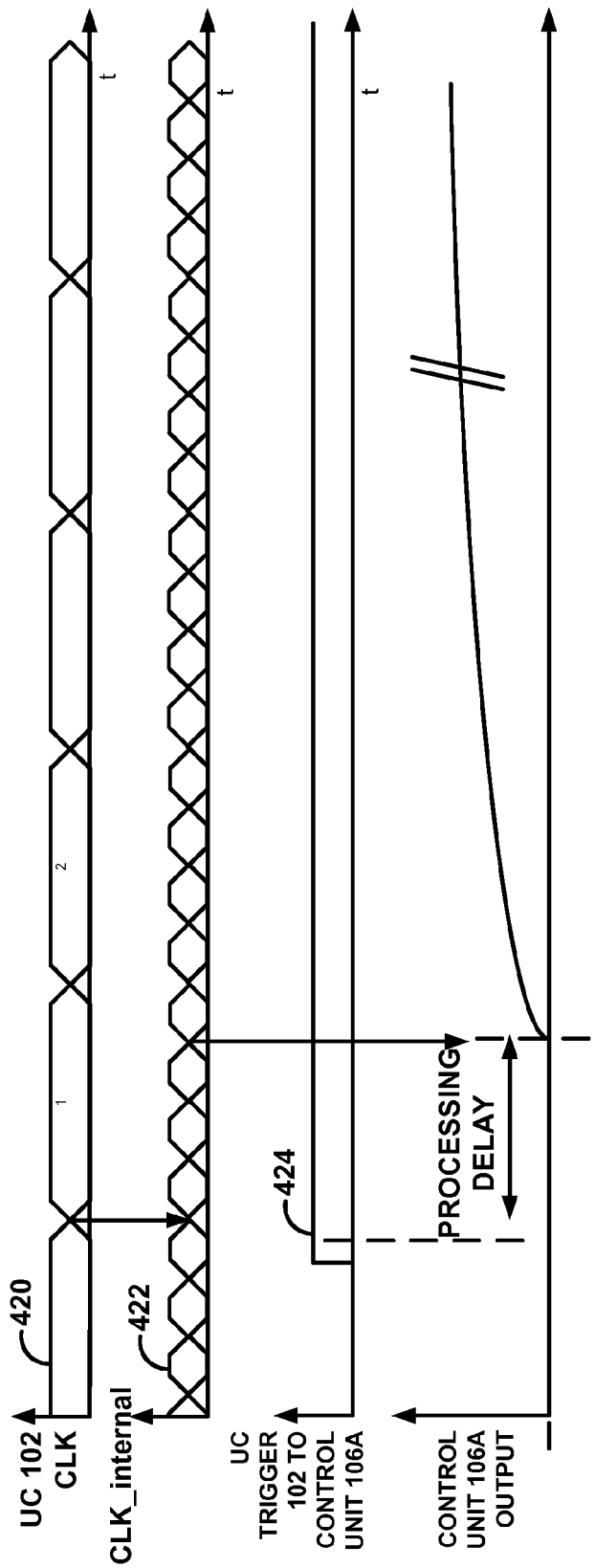
FIG. 5 illustrates a signaling diagram when the microcontroller and the driver IC are operating in a closed loop control configuration in accordance with the techniques of this disclosure.

FIG. 5 illustrates a signaling diagram when the microcontroller and the driver IC are operating in a closed loop control configuration in accordance with the techniques of this disclosure. In the example of FIG. 5, microcontroller 102 has a clock signal 420, denoted as "UC 102 CLK." Microcontroller 102 generates the clock using an oscillator, and provides the clock signal to clock 124 of driver IC 104. Clock 124 generates a faster, internal clock denoted as "CLK_internal," using a PLL. The faster clock generated by the PLL is then used as the internal clock for control units 106, as well as other function units of driver IC 104. The PLL generates the CLK_internal at a multiple of the frequency of clock 420, and as such, driver IC 104, and microcontroller 102 have synchronized clock signals.

In the closed loop system, microcontroller 102 may supply a trigger signal 424 to one of control units 106 using a trigger bus. For the purposes of this example, microcontroller 102 may generate and supply trigger signal 424 to control unit 106A via trigger input 138B. Trigger input 138B connects microcontroller 102 with control unit 106A using a trigger bus, which may a bus of communication bus 112.

Control unit 106A receive trigger signal 424, and after some processing delay, increases the current output (I_Inj) through driver unit 132A and solenoid 108A. Driver unit 132A may receive the input current, and generate a final output signal to actuate solenoid 108A after a delay period. In accordance with the techniques of this disclosure, outer loop 116 includes a trigger bus, and control unit 106A of driver IC 104 is configured to receive a trigger signal 424 from microcontroller 102 to cause driver IC 104 to actuate at least one of first solenoid 108A and second solenoid 108B.

In various examples, sensors 110 may provide detect the opening and closing of solenoids 108. Sensors 110 may detect the opening and closing of solenoids 108 based on detected feedback, such as dynamic current and voltage feedback, and other measures, such as RF coupling. Even if there is an undefined delay from a control flow generated by control units 106, to a current flow generated by driver units 132, sensors units 110 may still be able to detect system behavior, e.g. the position or other parameters related to solenoids 108.

Figure 6:
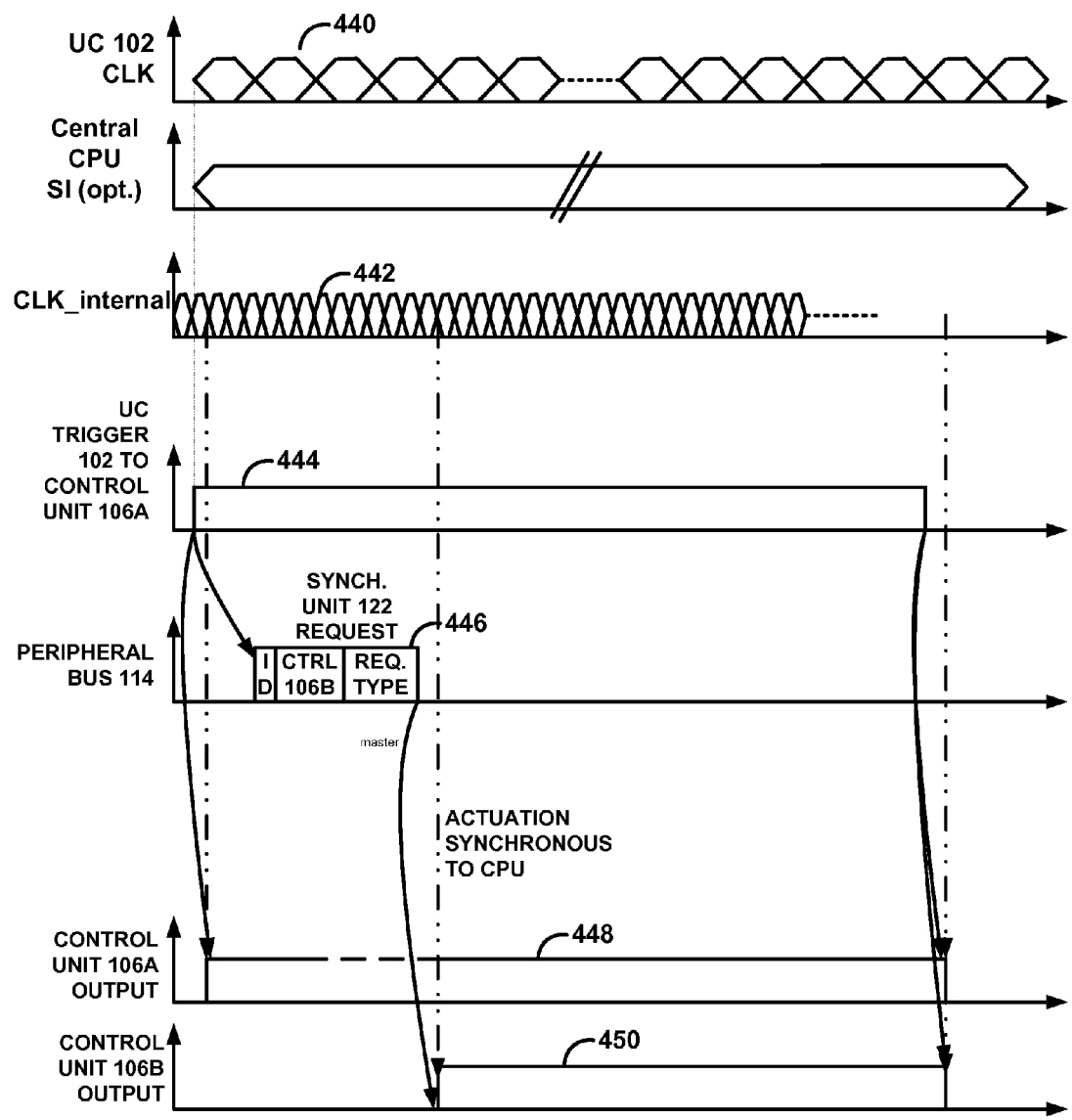
FIG. 6 illustrates a signaling diagram of a microcontroller and a driver integrated circuit operating in a split loop configuration in accordance with the techniques of this disclosure.

FIG. 6 illustrates a signaling diagram of a microcontroller and a driver integrated circuit operating in a split loop configuration in accordance with the techniques of this disclosure. As with FIG. 5, microcontroller 102 includes and generates a clock signal 440 (denoted as "UC 102 CLK"), and driver IC 104 includes a faster internal clock signal 442 that is synchronized with microcontroller clock signal 440.

In the example of FIG. 6, synchronization unit 122 is configured to transmit messages via peripheral bus 114 to control units 106. Control units 106 are configured to perform various actions responsive to receiving a message via peripheral bus 114 from synchronization unit 122. In this example, microcontroller 102 is configured to send a trigger signal 444 to a control unit, e.g. control unit 106A in this example. Trigger signal 444 causes control unit 106A to output current signal 448 to solenoid 108A using driver unit 132A.

Some period of time after control unit 106A receives trigger signal 444 from microcontroller 102, which may correspond to a processing delay, synchronization unit 122 may send a signal 446 to control unit 106B over peripheral bus 114. In some examples, the signals between control units 106 may comprise a simple hard-wired trigger signal on a serial or parallel bus, e.g. peripheral bus 114. In the examples where the message is a bus message, requests between control units 106 may include an ID field and a request type field. The ID field may include a "to" portion that identifies the destination or recipient of the message, and a "from" portion that indicates the sender of the message. The request type field indicates a requested action for the recipient to perform. Signal 446 has an ID value that identifies synchronization unit 122 as the source, control unit 106B as the destination. The request type field of signal 446 may be an "information" request type value.

Control unit 106B receives signal 446 over peripheral bus 114, decodes the signal, and outputs a signal 450 to driver unit 132A to actuate solenoid 108B. Peripheral bus 114 may be a clocked bus or a hard wired signal line. Accordingly, actuation of solenoid 108 by control unit 106B occurs synchronous with internal CPU clock 442.

At some later point in time, microcontroller 102 ceases transmitting the trigger signal 444 to master control unit 106. Responsive to detecting the termination of trigger signal 444, control unit 106A and control unit 106B cease actuating solenoids 108A, and 108B, respectively.

In accordance of the techniques of this disclosure, microcontroller 102 and driver IC 14 represent examples where at least one of control unit 106A and control unit 106B, in this example, control unit 106B, is configured to receive a message 446 via peripheral bus 114. Message 446 causes control unit 106B, in this example, to actuate at least one of solenoid 108A and solenoid 108B.

Figure 7:
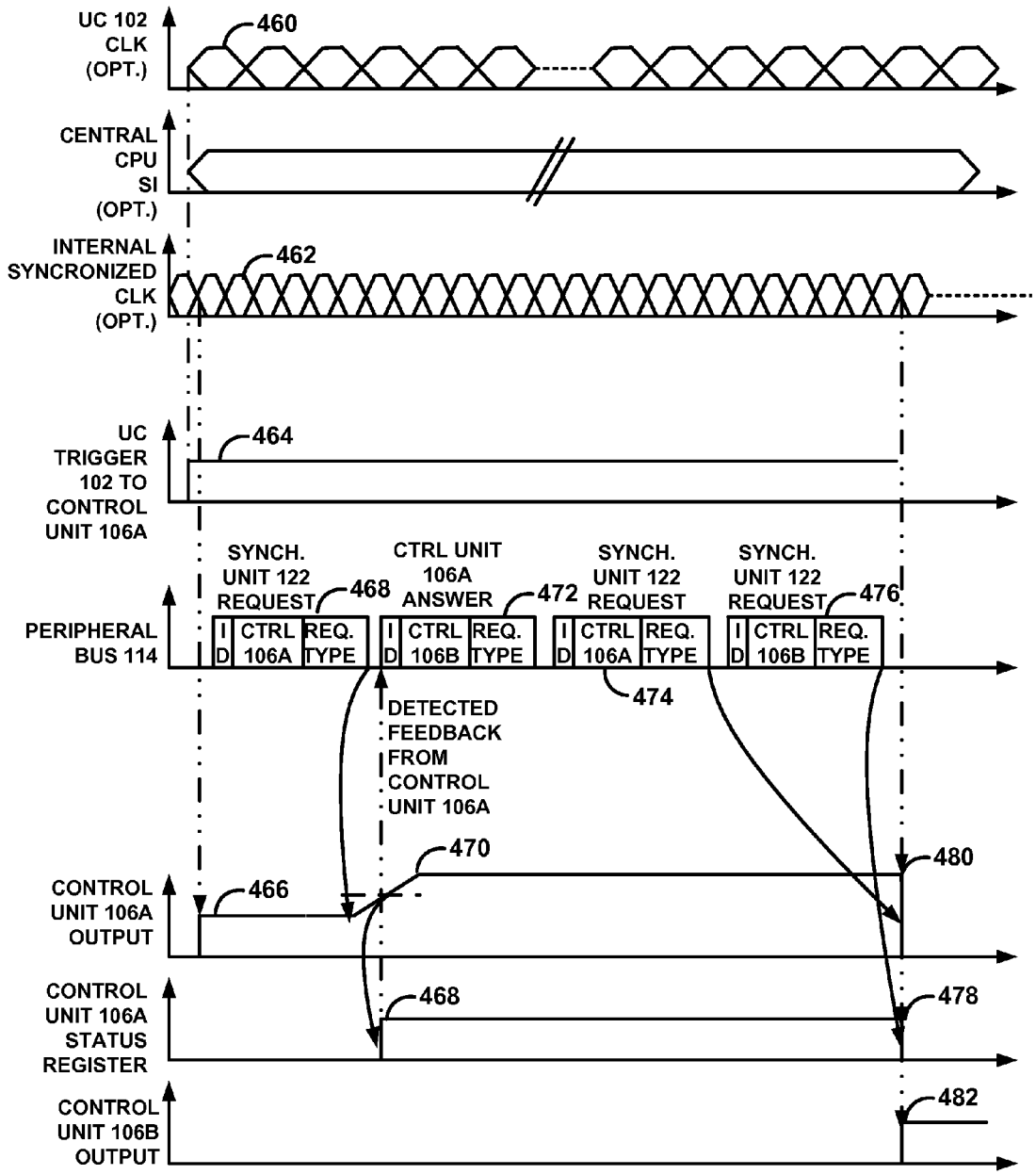
FIG. 7 illustrates a signaling diagram of a microcontroller and a driver integrated circuit operating in a split loop configuration in accordance with the techniques of this disclosure.

FIG. 7 illustrates a signaling diagram of a microcontroller and a driver integrated circuit operating in a split loop configuration in accordance with the techniques of this disclosure. As with FIGS. 5 and 6, in the example of FIG. 7, microcontroller 102 includes and generates a clock signal 460 (denoted as "UC 102 CLK"), and driver IC 104 includes a faster internal clock signal 462 that is synchronized with microcontroller clock signal 440. Clock signal 460 and clock signal 462 may both be optional signals.

In the example of FIG. 7, synchronization unit 122 is configured to transmit messages via peripheral bus 114 to control units 106. Control units 106 are configured to perform various actions responsive to receiving a message via peripheral bus 114 from synchronization unit 122. In this example, microcontroller 102 is configured to send a trigger signal 464 to a control unit, e.g. control unit 106A. Trigger signal 464 causes control unit 106A to output current signal 466 to solenoid 108A using driver unit 132A responsive to receiving trigger signal 464. Trigger signal 464 may be asynchronous in some examples.

Some period of time, after control unit 106A receives trigger signal 464 from microcontroller 102, which may correspond to a processing delay, synchronization unit 122 may send a first message 468 to control unit 106A over peripheral bus 114. First message 468 may request that control unit 106A detect an event, and responsive to detecting the event, that control unit 106A set a status register flag and/or send a message to control unit 106B indicating that the event has occurred.

First message 468 may have an ID field value that specifies that synchronization unit 122 is the sender of the message, a destination field that specifies control unit 106B as the destination, and a request type field value that specifies that control unit 106B should detect an event and notify control unit 106A responsive to detecting the event. In some examples, the request type field may also indicate more specific information regarding the event to detect, e.g. a particular type of measurement, and/or magnitude of measurement that a CCC of control unit 106A should detect.

Responsive to receiving first message 468 via peripheral bus 114, control unit 106A may detect that the event has occurred, and may set a flag of a status register of control unit 106A (468). In some examples, control unit 106A may detect the event using a CCC. Responsive to detecting that the event has occurred and setting the status flag, control unit 106A may increase current output (470) to solenoid 108 and transmit a second message 472 to control unit 106B via peripheral bus 114.

Second message 472 includes an ID field specifying control unit 106A as the source of the message, a destination field value that specifies control unit 106B as the destination of the message, and a request type field value. The value of the request type field may specify that control unit 106A has detected an event, as well as other details about the event, such as the type of event, magnitude, etc.

At some later time relative to second message 472, synchronization unit 474 may transmit a third message 474 to control unit 106A. The ID field value of third message 474 may specify that synchronization unit 122 is the source of the message. The destination field may value indicate that control unit 106A is the destination of third message 472. The request type field may indicate that control unit 106A should terminate actuation of solenoid 108A responsive to detecting that trigger signal 464 has ceased.

Synchronization unit 122 may also send a fourth message 476 to control unit 106B. Fourth message 476 may include an ID field value that specifies synchronization unit 122 as the source of the message, and a destination field value that specifies control unit 106B as the destination of the message. The request type field value may specify that control unit 106B should output current to actuate solenoid 108B responsive to detecting that trigger signal 464 has terminated.

At some time after receiving third message 474, control unit 106A detects that rigger signal 464 has ceased. Responsive to detecting that trigger 474 has terminated, control unit 106A ceases output of current driver unit 132A, causing actuation of solenoid 108A to terminate (480). Also responsive to detecting that trigger signal 474 has terminated, control unit 106A lowers the flag of the status register (478).

Control unit 106B may detect that the flag of the status register of control unit 106A has been lowered. Responsive to detecting that the flag has been lowered, control unit 106B may begin outputting current to driver unit 132B, which causes the actuation of solenoid 108B (482).

In accordance with the techniques of this disclosure, FIG. 7 illustrates examples in which control unit 106A of driver IC 104 includes a status register. And control unit 106A is configured to set a flag in a status register responsive to detecting a condition. In this example, and the control unit 106B is further configured to determine that the flag is set, and actuate the second solenoid responsive to determining that the flag is set. FIG. 7 also illustrates an example in which control unit 106A and control unit 106B unit communicate via inner control loop 118 using trigger signal 464 to actuate the at least one of solenoids 108.

Figure 8:
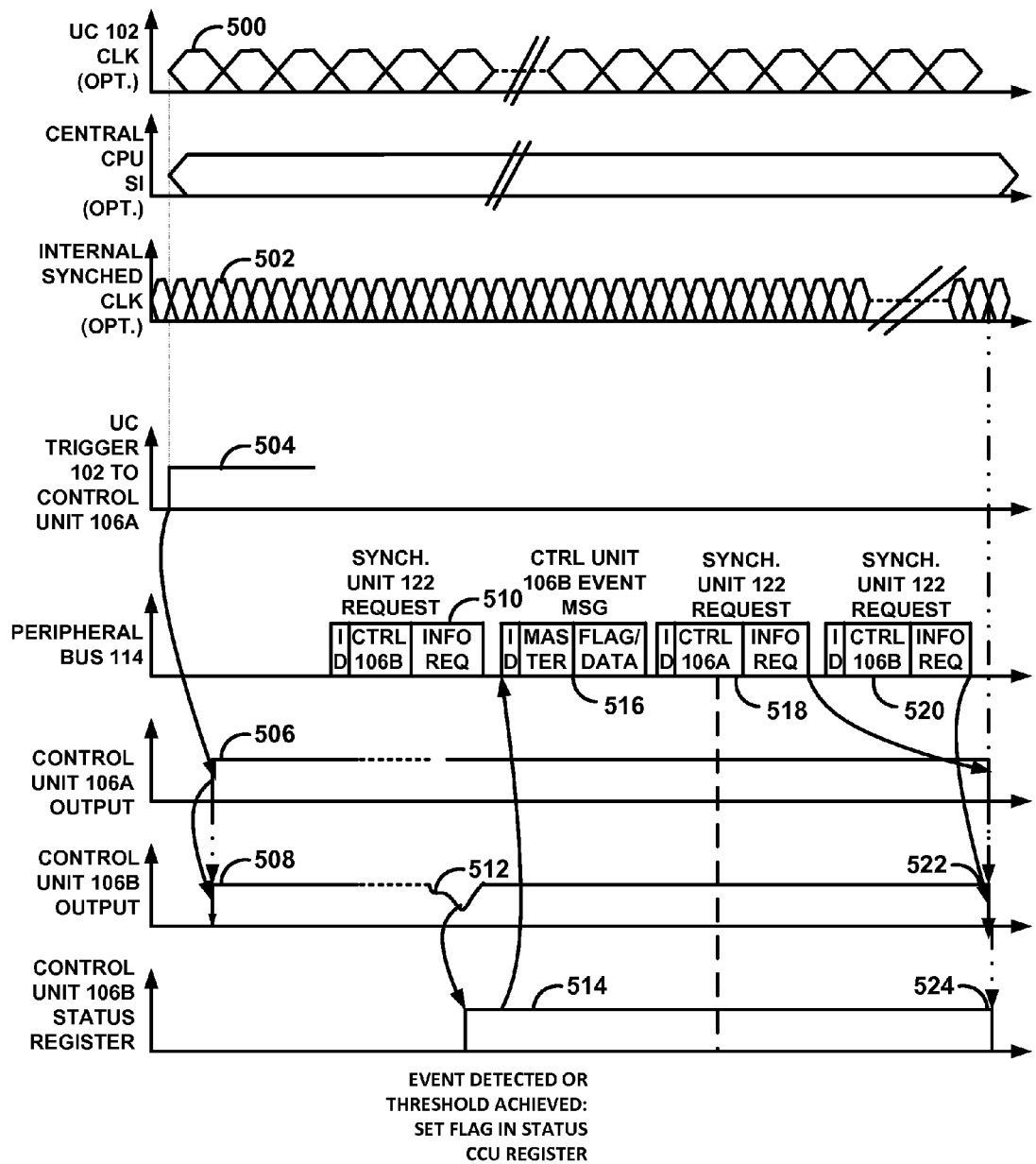
FIG. 8 illustrates a signaling diagram of a microcontroller and a driver integrated circuit operating in a split loop configuration in accordance with the techniques of this disclosure.

FIG. 8 illustrates a signaling diagram of a microcontroller and a driver integrated circuit operating in a split loop configuration in accordance with the techniques of this disclosure. As with FIG. 5, microcontroller 102 has a clock signal 500 (denoted as "UC 102 CLK"). Microcontroller 102 provides clock signal 500 to clock 124 of driver IC 104. Clock 124 generates a faster, internal synchronized clock 502 using a PLL. The faster clock generated by the PLL is then used as the internal clock for control units 106, synchronization unit 122, as well as other function units of driver IC 104. The PLL generates clock 502 at a multiple of the frequency of clock 500, and as such, driver IC 104, and microcontroller 102 have synchronized clock signals.

Microcontroller 102 may supply a trigger signal 504 to control unit 106A and control unit 106B using a trigger bus via trigger input 138A and trigger input 138B. Responsive to receiving trigger signal 504, control unit 106A may actuate solenoid 108A (506), and control unit 106B may actuate second solenoid 108B (508). The actuation of solenoids 108 may be asynchronous in some examples.

Sometime after actuating solenoids 108, synchronization unit 122 transmits a first message 510 to control unit 106B via peripheral bus 114 requesting a subsequent message when control unit 106B detects an event. Each of the messages of FIG. 8 includes an ID field, a destination field, and a request type field. The value of the ID field of first message 510 specifies that synchronization unit 122 is the source of the message, and the destination field value specifies that control unit 106B is the destination of the message. The value of the information request field of first message 510 may indicate that synchronization unit 122 requests a feedback responsive to control unit 106B detecting that an event has occurred. The message type field value indicates that synchronization unit 122 requests feedback when control unit 106 detects an event or that a certain threshold measurement level has been reached, e.g. from one of sensors 110, e.g. based on detected current and/or voltage signal levels. In various examples, the event type or threshold level may be specified in first message 510.

Responsive to receiving first message 510 and sometime after control unit 106B actuates solenoids 108B, control unit 106B detects an event or that a measurement has reached a threshold (512). Responsive to detecting the event, control unit 106B raises a status flag of a status register (514), e.g. of a CCC of control unit 106B. Also responsive to the detected event or measurement, control unit 106B sends a second message 516 indicating that control unit 106B has detected the event to synchronization unit 122. The ID value field of second message 516 indicates control unit 106B as the source of the message, and the value of the destination field indicates that synchronization unit 122 is the destination of the message. The request type field value has a flag/type value, which may indicate that control unit 106B has raised the flag in the status register responsive to detecting an event.

At some later time, and responsive to receiving second message 516, synchronization unit 122 transmits third message 518 to control unit 106A, and fourth message 520 to control unit 106B. The ID field of third message 518 specifies that synchronization unit 122 is the source, and the destination field of third message 518 indicates that control unit 106A is the destination of the message. The request type field value indicates that control unit 106A should cease or change the mode of actuation of solenoid 108A. Similarly, the ID field of fourth message 520 specifies that synchronization unit 122 is the source, and the destination field of fourth message 520 indicates that control unit 106B is the destination of the message. The request type field value indicates that control unit 106B should cease or change the mode of actuation of solenoid 108B. Responsive to receiving third message 518, control unit 106A may terminate actuation of solenoid 108A (522), and responsive to receiving fourth message 520, control unit 106B may terminate actuation of solenoid 108B (524). In some examples, the termination or change in the actuation of solenoids 108 may be caused due to a certain control point in a current profile having been reached or that an actuator position has been reached (e.g., in the examples described with respect to FIG. 3).

In this manner, FIG. 8 illustrates the operation of an example device comprising a driver integrated circuit (IC) 104 comprising a control unit 106A, control unit 106B, a first solenoid 108A that is electrically coupled to control unit 108A, a second solenoid 108B that is electrically coupled to control unit 106B, and sensors 110. The driver IC 104 further includes a clock that synchronizes microcontroller 102 and driver IC 104, and a peripheral bus 114 that communicatively couples control unit 106A, and control unit 106B. In the device, microcontroller 102 and driver IC 104 form an outer control loop 116 that actuates solenoid 108A and the second solenoid 108B. Control unit 106A, control unit 106B, and sensors 110 form an inner control loop 112 that controls the first solenoid 108A and the second solenoid 108B. In the example of FIG. 8, control unit 106B includes a status register. Control unit 106B is configured to set a flag in the status register of control unit 106B responsive to detecting a condition, and the control unit 106A is further configured to determine that the flag is set and actuate the second solenoid 108A responsive to determining that the flag is set.

In accordance of the techniques of this disclosure, microcontroller 102 and driver IC 14 represent examples where at least one of control unit 106A and control unit 106B, in this example, control unit 106A, is configured to receive a message 446 via peripheral bus 114. Message 446 causes at least one of control unit 106A and control unit 106B, control unit 106B in this example, to actuate at least one of solenoid 108A and solenoid 108B.

In some examples, at least one of control unit 106A and control unit 106B may capture data from sensors 110 of inner control loop 118, e.g. using a CCC. In this example, the one of control unit 106A and control unit 106B may further be configured to transmit data back to microcontroller 102, e.g. using a bus of communication bus 112. The one of control units 106A and 106B may be further configured to receive a control signal from microcontroller 106A responsive to transmitting the data to microcontroller 102 via outer control loop 118. The control signal received from microcontroller 102 may be based on captured sensor data from one or more of sensors 110 and a time base (e.g. a timestamp).

Figure 9:
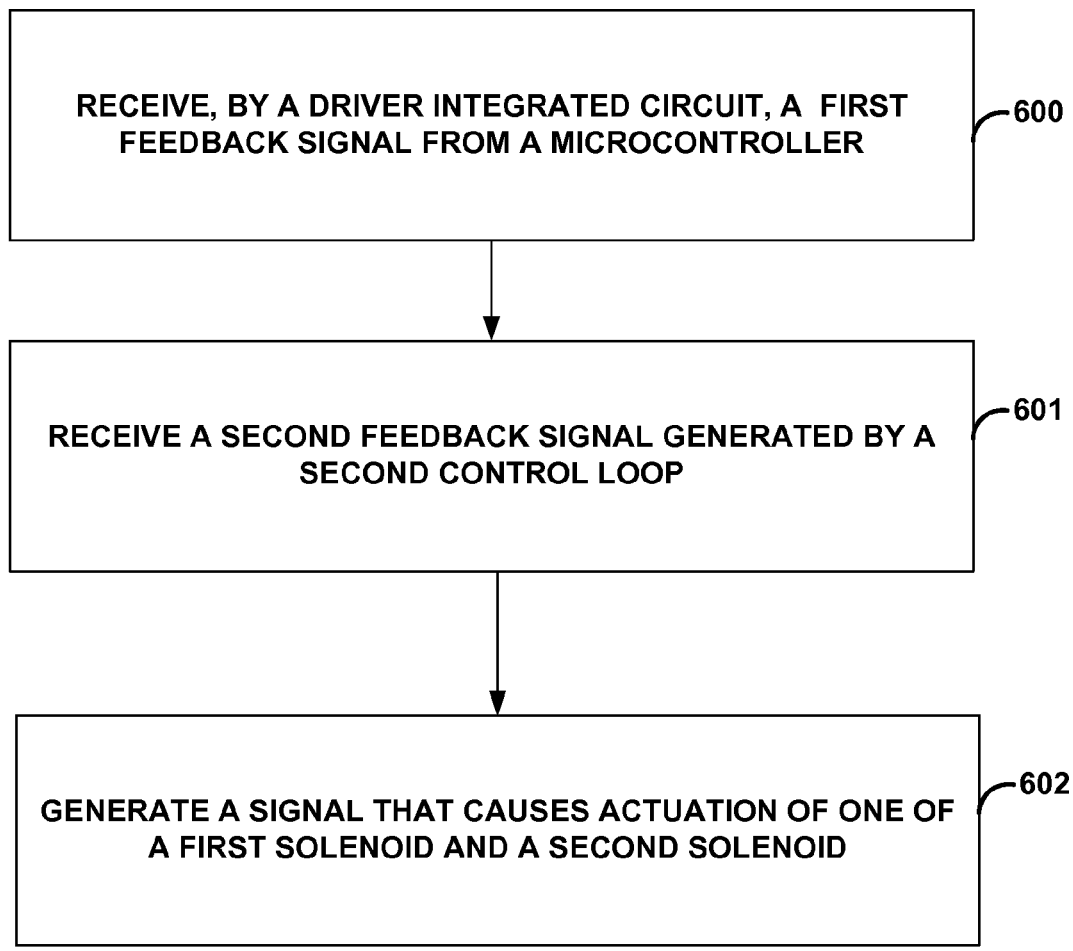
FIG. 9 is a flowchart illustrating a method for actuating a solenoid in accordance with one or more techniques of this disclosure.

FIG. 9 is a flowchart illustrating a method for actuating a solenoid in accordance with one or more techniques of this disclosure. For the purposes of example, it should be understood that the method of FIG. 9 may be performed by control system 100, including microcontroller 102, and driver IC 104.

In the method of FIG. 9, driver IC 104, which includes a first control unit 106A configured to control a first solenoid, and a second control unit 106B configured to control a second solenoid 108B. Driver IC 104 may receive a first feedback signal from microcontroller 102 (600). In various examples, the feedback signal may comprise a control signal. An outer control loop may generate the first feedback signal via a first control loop that comprises microcontroller 102, first control unit 106A, and second control unit 106B.

In the method of FIG. 9, at least one of the first control unit 106A and the second control unit 106B, may receive a second feedback signal generated via a second control loop that comprises the first control unit 106A, the second control unit 106B, and at least one of sensors 110 (602). The method of FIG. 9 further comprises generating, by at least one of microcontroller 102, first control unit 106A, and second control unit 106B, based on at least one of the first feedback signal and the second feedback signal, a signal that causes one of first control unit 106A and second control unit 106B to actuate one of the solenoid 108A and second solenoid 108B (602).

In some examples of the method of FIG. 9, the first control loop further includes a trigger bus, which may comprise a bus of communication bus 112. Driver IC 104 may also be further configured to receive a trigger signal from microcontroller 102 via the trigger bus; and actuate, with driver IC 104, at least one of first solenoid 108A and second solenoid 108B responsive to receiving the trigger signal.

In another example, the method of FIG. 9 may further include receiving, with at least one of first control unit 106A and second control unit 106B and from microcontroller 102, a message via the peripheral bus. At least one of the first control unit and the second control unit may be further configured to actuate at least one of first solenoid 108A and second solenoid 108B responsive to receiving the message via the peripheral bus.

In another example, first control unit 106A may be further configured to detect a condition. First control unit 106A may be further configured to set a flag value responsive to detecting the condition, and store the in a status register. Second control unit 106B may be further configured to determine that the second flag is set and actuate second solenoid 108B responsive to determining that the flag is set.

In various examples, sensors 110 comprise at least one sensor of an automotive transmission, and first solenoid 108A may be configured to actuate a first clutch of the automotive transmission. First solenoid 108A may comprise a first clutch solenoid. Second solenoid 108B may be further configured to a second clutch of the automotive transmission, and second solenoid 108B may comprise a second clutch solenoid.

In yet another example, at least one of sensors 110 may comprise at least one sensor or signal feedback of an automotive direct injection fuel system. In this example, first solenoid 108A may be further configured to actuate a first direct fuel injector in accordance with a current profile, and first solenoid 108A may comprise a first fuel injector solenoid. Second solenoid 108B may be further configured to actuate a second direct fuel injector in accordance with the current profile, and second solenoid 108B may comprise a second fuel injector solenoid.

The techniques described in this disclosure may be implemented, at least in part, in hardware, software, firmware, or any combination thereof. For example, various aspects of the described techniques, including the disclosed transmission control systems, may be implemented within one or more processors, including one or more microprocessors, digital signal processors (DSPs), application specific instruction set processor (ASIP), (programmable state machines), field programmable gate arrays (FPGAs), or any other equivalent integrated or discrete logic circuitry, as well as any combinations of such components. The term "control system" or "controller" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Various examples of this disclosure have been described. Modification of the described examples may be made within the spirit of this disclosure. These and other examples are within the scope of the following claims.

What is claimed is:

1. A device comprising:
a driver integrated circuit (IC) comprising a first control unit and a second control unit;
a first solenoid that is electrically coupled to the first control unit;
a second solenoid that is electrically coupled to the second control unit;
at least one sensor;
a clock that synchronizes a microcontroller and the driver IC; and
a peripheral bus that communicatively couples the first control unit and the second control unit;
wherein the microcontroller and the driver IC form an outer control loop configured to generate a control signal that controls actuation the first solenoid and the second solenoid; and
wherein the first control unit, the second control unit, and the at least one sensor form an inner control loop configured to generate, based upon the control signal, an actuation signal that actuates the first solenoid and the second solenoid.

2. The device of claim 1,
wherein the at least one sensor comprises at least one of: at least one sensor of an automotive transmission and signal feedback of an automotive transmission,
wherein the first solenoid comprises a first clutch solenoid that actuates a first clutch of the automotive transmission, and
wherein the second solenoid comprises a second clutch solenoid that actuates a second clutch of the automotive transmission.

3. The device of claim 1,
wherein the at least one sensor comprises at least one of: at least one sensor of an automotive direct injection fuel system,
wherein the first solenoid comprises a first fuel injector solenoid that actuates a first injector of the direct injection engine system in accordance with a current profile, and
wherein the second solenoid comprises a second fuel injector solenoid that actuates a second injector of the direct injection engine system in accordance with the current profile.

4. The device of claim 1,
wherein the outer control loop includes a trigger bus, and the driver IC is further configured to:
receive the control signal from the microcontroller via the trigger bus, and
actuate at least one of the first solenoid and the second solenoid based upon the control signal.

5. The device of claim 1,
wherein at least one of the first control unit and the second control unit is configured to receive a message via the peripheral bus,
wherein the message causes the at least one of the first control unit and the second control unit to actuate at least one of the first solenoid and the second solenoid.

6. The device of claim 1,
wherein the driver IC further comprises a status register,
wherein the first control unit is configured to set a flag in the status register responsive to detecting a condition, and
wherein the second control unit is further configured to:
determine that the flag is set; and
actuate the second solenoid responsive to determining that the flag is set.

7. The device of claim 1,
wherein the first control unit and the second control unit communicate via the inner control loop using a trigger bus to actuate at least one of the first solenoid and the second solenoid.

8. The device of claim 1, further comprising:
a second driver IC, wherein the second driver IC includes at least one solenoid, and
wherein the second driver IC is communicatively coupled to the first driver IC, and
wherein the second driver IC is configured to actuate the at least one solenoid responsive to receiving a message from the first driver IC.

9. The device of claim 1,
wherein the at least one sensor of the inner control loop includes at least one of a voltage sensor, a voltage acquisition measure, a current acquisition measure, a current sensor, a position sensor, a pressure sensor, and an RF (radio frequency) signal feedback sensor, and
wherein the driver IC is configured to actuate at least one of the first solenoid and the second solenoid based on the at least one of the voltage sensor, voltage acquisition measure, current sensor, current acquisition measure, position sensor, pressure sensor, and the RF signal feedback sensor.

10. The device of claim 1, wherein the driver IC is further configured to:
capture data from the at least one sensor of the inner control loop; and
transmit the data to the microcontroller via the outer control loop.

11. The device of claim 10, further comprising:
receiving the control signal from the microcontroller responsive to transmitting the data to the microcontroller via the outer loop,
wherein the control signal is based on captured sensor data from the at least one sensor and a time base.

12. The device of claim 1,
wherein the driver IC is further configured to:
capture at least one of current, voltage, and temperature data from one or more of the at least one sensor of the inner loop, the first solenoid, and the second solenoid; and
perform a safety measure based on the captured data from the at least one sensor of the inner loop.

13. The device of claim 12, wherein to perform the safety measure, the driver IC is further configured to:
perform at least one of power-stage protection and actuator protection of at least one of the first solenoid and the second solenoid.

14. The device of claim 13, wherein to perform the safety measure, the driver IC is further configured to:
perform a safe power stage switch-off in order to avoid at least one of system damage and harming humans.

15. A method comprising:
receiving, from a microcontroller by a driver IC that includes a first control unit configured to control a first solenoid and a second control unit configured to control a second solenoid, a first feedback signal generated via a first control loop that comprises the microcontroller, the first control unit, and the second control unit;
receiving, by at least one of the first control unit and the second control unit, a second feedback signal generated via a second control loop that comprises the first control unit, the second control unit, and at least one sensor;
generating, by at least one of the microcontroller, the first control unit, and the second control unit based on at least one of the first feedback signal and the second feedback signal, a control signal; and
actuating, by one of the first control unit and the second control unit and based upon the control signal, one of the first solenoid and the second solenoid.

16. The method of claim 15, wherein the at least one sensor comprises at least one sensor of an automotive transmission, wherein actuating, by one of the first control unit and the second control unit and based upon the control signal, one of the first solenoid and the second solenoid comprises:
actuating, with the first solenoid, a first clutch of the automotive transmission, wherein the first solenoid comprises a first clutch solenoid; and
actuating, with the second solenoid, a second clutch of the automotive transmission, wherein the second solenoid comprises a second clutch solenoid.

17. The method of claim 15,
wherein the at least one sensor comprises at least one sensor of an automotive direct injection fuel system, wherein actuating, by one of the first control unit and the second control unit and based upon the control signal, one of the first solenoid and the second solenoid comprises:
actuating, with the first solenoid, a first direct fuel injector in accordance with a current profile, wherein the first solenoid comprises a first fuel injector solenoid; and
actuating, with the second solenoid, a second direct fuel injector in accordance with the current profile, wherein the second solenoid comprises a second fuel injector solenoid.

18. The method of claim 15, wherein the first control loop further includes a trigger bus, the method further comprising:
receiving, with the driver IC, the control signal from the microcontroller via the trigger bus; and
actuating, with the driver IC, at least one of the first solenoid and the second solenoid responsive to receiving the control signal.

19. The method of claim 15, the method further comprising:
receiving, with at least one of the first control unit and the second control unit and from the microcontroller, a message via the peripheral bus; and
actuating, with the at least one of the first control unit and the second control unit, at least one of the first solenoid and the second solenoid responsive to receiving the message via the peripheral bus.

20. The method of claim 15, further comprising:
detecting, with the first control unit, a condition;
setting, with the first control unit, a flag value responsive to detecting the condition, wherein the flag is stored in a status register;
determining, with the second control unit, that the second flag is set; and
actuating, with the second control unit, the second solenoid responsive to determining that the flag is set.

* * * * *